Dec. 7, 1926.
T. H. MOSELEY ET AL
1,609,658
VALVE
Filed Feb. 24, 1926
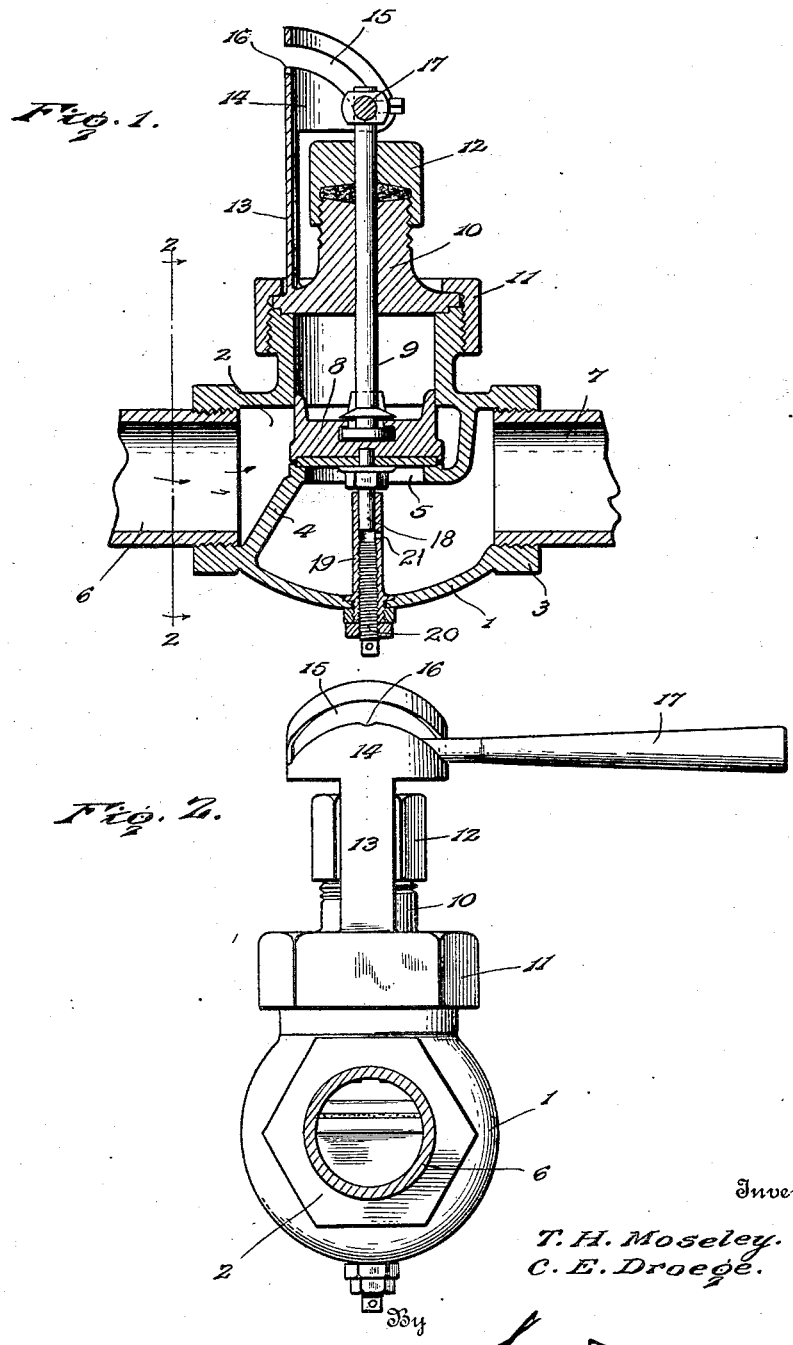
Inventors
T. H. Moseley.
C. E. Droege.
By Lacy & Lacy, Attorneys Patented Dec. 7, 1926.

1,609,658

UNITED STATES PATENT OFFICE.

THOMAS H. MOSELEY, OF OKLAHOMA CITY, AND CHARLES E. DROEGE, OF CUSHING, OKLAHOMA.

VALVE.

Application filed February 24, 1926. Serial No. 90,378.

Our invention relates to valves and has for its object the provision of a simple and efficient construction whereby the valve may be very rapidly opened when such adjustment is desired. Another object of the invention is to provide simple means whereby the shock imposed upon the line or circulating system when the valve is opened or closed will be absorbed. These objects are attained in such a device as is illustrated in the accompanying drawing, and the invention resides in certain novel features which will be particularly pointed out in the appended claims.

In the drawing:

Figure 1 is a longitudinal section through a valve embodying our present invention, and Fig. 2 is a view, partly in elevation and partly in transverse section, on the line 2—2 of Fig. 1.

The valve casing 1 is of a common design including an inlet nipple 2, an outlet nipple 3 and an internal web or partition 4 having an opening 5 therethrough for the passage of fluid, the upper surface of the web around the said opening constituting a valve seat. The valve casing is secured within a line or between pipe sections 6 and 7 by threaded engagement of the said pipe sections with the respective nipples, as will be readily understood upon reference to the drawing. The valve proper consists of a disk or the like 8 which is of proper diameter to extend over the port or opening 5 and cover the same when it is seated, and this disk is mounted upon the lower end of a stem 9 which rises through the central bore of a bonnet 10 secured upon the upper side of the valve casing by a collar 11, as shown. A gland 12 is secured upon the upper end of the bonnet around the valve stem so as to prevent leakage. Rising from the base portion of the bonnet 10 is a standard or post 13 which may be fixed to the bonnet in any desired manner and is illustrated as formed integral therewith. The upper end of this post or support is expanded laterally so as to define a head 14 which is of a general arcuate form concentric with the stem 9 and has formed therein a slot 15 which is arcuate and extends from end to end of the head or guide 14, the ends of the slot being disposed at lower points than its center and the lower wall of the slot being provided at its center or apex with a slight notch or seat 16. A lever or handle member 17 is secured to the upper end of the valve stem 9 and extends radially therefrom through the slot 15, as clearly shown.

Depending from the under side of the valve, and preferably at the center thereof, is a plunger 18 which fits snugly but slidably in the upper end of a cylinder 19 which is secured in the bottom of the valve casing and rises within the same below the partition. The lower end of this cylinder is closed by a plug 20 which is threaded into the cylinder so that it may be set at any desired point longitudinally of the cylinder and thereby vary the effective working length of the same. A vent 21 is provided in the side of the cylinder above the plug 20 and below the range of movement of the plunger 18. The cylinder may be secured in the casing in any approved manner and is illustrated as having threaded engagement with the wall of the valve casing and equipped with a lock nut below the casing so that it may be firmly secured in place. The threaded plug is also shown as provided with a lock nut so that it may be securely fastened in any position to which it may be adjusted.

The action of our improved valve will, it is thought, be readily understood from the foregoing description, taken in connection with the accompanying drawing. The valve is shown seated in Fig. 1, and it will be noted that the pressure of the inflowing fluid is exerted upon the upper side of the disk 8 so as to tend to hold the same in seated position, the flow being effectually cut off. When it is desired to permit the fluid to flow through the valve casing and circulate through the outlet pipe 7, the handle or lever 17 is swung through one quarter of a turn and will thereupon ride upwardly upon the lower wall of the slot 15 and seat in the recess or notch 16. Inasmuch as the lower wall of the slot is inclined upwardly from its ends, the swinging of the lever or handle member through the arc of a circle will cause it to, at the same time, move upwardly so that the valve will be quickly lifted from its seat and the circulation of the fluid permitted. As the lever engages the seat or notch 16, it will be held in its raised position so that the valve will be maintained in its open adjustment. When the valve is opened, the pressure of the flowing fluid will be exerted against the under side thereof so that it tends to hold the valve raised and thereby aids in maintaining the adjustment. When the closing of the valve is desired, the handle will be swung toward the end of the guide slot 15 and will thereupon ride upon the upper wall of the slot so that it will be deflected downwardly to effect lowering and consequent closing of the valve.

It will be noted that the plunger 18, working snugly in the upper end of the cylinder 19, will tend to compress or trap any air or other fluid which may be within the upper end of the cylinder and will, consequently, be cushioned in its downward movement so that the shock of closing the valve will be absorbed and no jarring or hammering will occur in the system. When the valve is opened or raised, the fluid in the system will set up a reverse flow through the vent 21 so that a vacuum will never exist below the plunger 18. Moreover, in the opening movement there will be a trapping of air or fluid between the valve and the bonnet 10 so that the upward movement of the valve will also be cushioned.

It will be seen that we have provided a very simple mechanism whereby a valve may be quickly opened or closed. The valve may be used in any place where it is desirable to have the cut-off valve either fully opened or fully closed and is especially desirable for the circulating pipes of hot water heating plants.

Having thus described the invention, we claim:

1. The combination with a valve casing, and a cut-off valve therein, of a stem slidably mounted through the top of the casing and carrying the valve, a post rising from the casing at one side of the stem and provided at its upper end with a guiding head defining an arc concentric with the stem, said head having a guide slot therein which is disposed in an inclined position relative to the top and bottom of the head, and a lever secured to the upper end of the valve stem and extending through said slot.

2. The combination with a valve casing having a partition provided with a port therethrough, a valve seating over said port to cover the same, means for quickly raising and lowering the valve, a cylinder rising within the valve casing below the partition and provided with a vent in its side, the lower end of the cylinder being closed, and a plunger depending from the valve and fitting snugly but slidably in the upper end of the cylinder, the vent being below the range of movement of the plunger.

3. The combination with a valve casing having a partition provided with a port therethrough, a valve seating over said port to cover the same, means for quickly raising and lowering the valve, a cylinder rising within the valve casing below the partition and provided with a vent in its side, a plug adjustably fitted in the lower end of the cylinder to close the same, and a plunger depending from the valve and fitting snugly but slidably in the upper end of the cylinder, the vent in the side of the cylinder being below the range of movement of the plunger.

In testimony whereof we affix our signatures.

CHARLES E. DROEGE. [L. S.]
THOMAS H. MOSELEY. [L. S.]